US012627921B2

(12) United States Patent
Chan et al.

(10) Patent No.: US 12,627,921 B2
(45) Date of Patent: May 12, 2026

(54) PASSIVE RADIATOR WITH ADJUSTABLE WORKING FREQUENCY

(71) Applicant: Glass Acoustic Innovations Co., Ltd., New Taipei (TW)

(72) Inventors: Kwun-Kit Chan, New Taipei (TW); Chi-Chou Ho, New Taipel (TW)

(73) Assignee: Glass Acoustic Innovations Co., Ltd., New Taipei City (TW)

( * ) Notice: Subject to any disclaimer, the term of this patent is extended or adjusted under 35 U.S.C. 154(b) by 248 days.

(21) Appl. No.: 18/507,061

(22) Filed: Nov. 12, 2023

(65) Prior Publication Data

US 2024/0236554 A1 Jul. 11, 2024

(30) Foreign Application Priority Data

Jan. 9, 2023 (TW) ................................ 112100828

(51) Int. Cl.

| | |
|---|---|
| ***H04R 1/28*** | (2006.01) |
| ***H04R 7/20*** | (2006.01) |
| ***H04R 9/06*** | (2006.01) |

(52) U.S. Cl.

CPC ......... *H04R 1/2834* (2013.01); *H04R 1/2803* (2013.01); *H04R 1/2819* (2013.01); *H04R 7/20* (2013.01); *H04R 9/06* (2013.01); *H04R 2400/11* (2013.01); *H04R 2499/15* (2013.01)

(58) Field of Classification Search

CPC .. H04R 1/2803; H04R 1/2819; H04R 1/2834; H04R 7/20; H04R 9/06; H04R 2400/11; H04R 2499/15

See application file for complete search history.

(56) References Cited

U.S. PATENT DOCUMENTS

| | | | | |
|---|---|---|---|---|
| 2016/0219362 | A1* | 7/2016 | Litovsky | H04R 1/2834 |
| 2018/0077486 | A1* | 3/2018 | Li | H04R 1/2834 |
| 2022/0303669 | A1* | 9/2022 | Gulledge | H04R 7/20 |

* cited by examiner

*Primary Examiner* — Huyen D Le

(74) *Attorney, Agent, or Firm* — Chih Feng Yeh; Yongjean Consulting Inc.

(57) ABSTRACT

A passive radiator with adjustable working frequency, which includes a chassis, a vibrating plate movably coupled to the chassis by a suspension component, and an added weight device arranged outside the vibrating plate. The added weight device is replaceable to adjust the working frequency of the passive radiator.

5 Claims, 8 Drawing Sheets

57

PASSIVE RADIATOR WITH ADJUSTABLE WORKING FREQUENCY

CROSS-REFERENCE STATEMENT

The present application is based on, and claims priority from, TAIWAN patent application Serial Number 112100828, filed Jan. 9, 2023, the disclosure of which is hereby incorporated by reference herein in its entirety.

BACKGROUND

Technical Field

The present invention relates to a passive radiator, more specifically, to a passive radiator with adjustable working frequency.

Related Art

A loudspeaker, commonly referred to as a speaker or speaker driver, is an electroacoustic transducer that converts an electrical audio signal into a corresponding sound. For some large speakers, the quality of the sound they play generally depends on the design of the speakers.

Three main speaker designs are typically sealed enclosure, vented enclosure (bass reflex enclosure) and passive types. FIG. 1A shows a traditional vented enclosure speaker with a chassis 11. The design employs an inverted tube 13 with an outlet 13*a* to resonate the sound behind the speaker 15 and reverse the phase of the sound to enhance the sound quality, it is also called the bass reflex speaker. This speaker enables the sound from the rear side of the diaphragm to increase the efficiency of the system at low frequencies. FIG. 1B shows a traditional speaker with passive radiator. The design of the passive radiator speaker is similar to the one of the bass reflex speakers. The passive radiator 17 is utilized to replace the inverted tube 13. It is also a sound generator without a driving system. The passive radiator 17 may resonance and the air inside the speaker is then compressed or expanded, thereby generating the sound.

The function of the bass reflex speaker (FIG. 1A) and the passive radiator speaker (FIG. 1B) is to increase the efficiency of the system at low frequencies, the frequency at which the chassis/port system resonates depends upon the effective length and cross-sectional area of the tube, the internal volume of the enclosure. The passive radiators are similar in operation to ported bass reflex systems, and both methods are used for the same reason: to extend the system's low frequency response. A passive radiator is the use of one or more additional diaphragms in a cabinet instead of ports. These passive diaphragms do not have a magnet or voice coil and are not connected to a power amplifier. In the prior art, when the passive radiator is assembled, the size, and the weight of the passive radiator are fixed and cannot be changed.

From above, the operating frequency of the system cannot be adjusted once the speaker is assembled, in order to improve the drawbacks, the present invention provides replaceable passive radiators so that the operating frequency of the passive system is adjustable to meet the market demands.

SUMMARY

Based on above, the purpose of the present invention is to provide a passive radiator with adjustable working frequency. The passive radiator includes a chassis, a vibration plate is connected to the chassis by a suspension component. An added weight device is arranged on the vibrating plate; and the wight of the added weight device is changeable to adjust the working frequency of the passive radiator.

In one example, the added weight device is configurated on the vibrating plate by magnetic attraction, screw fixation, buckle fixation, or hook and loop fastener. The pluralities of the added weight device are provided with different materials or different thicknesses.

In one aspect of the present invention, the combination of pluralities of the added weight devices form an integrated added weight device. The integrated added weight device includes a central weight and at least one annular weight. In further embodiment. the added weight device includes a mobile phone, a tablet computer or an e-book. Alternatively, the added weight device is formed outside of the vibration plate.

In another embodiment, the present invention discloses a passive radiator with adjustable working frequency includes a chassis; a vibration plate, a first suspension component and a second suspension component formed on an upper and lower sides of an outer supporting frame to connect with an inner supporting frame for increasing vertical vibration stability of the vibration plate, the vibration plate is connected to the chassis by the first suspension component; an added weight device is arranged on the vibrating plate; and the wight of the added weight device is changeable to adjust the working frequency of the passive radiator. In one case, the outer supporting frame and the inner supporting frame have frame structures extending along a direction perpendicular to the surface of the vibration plate.

In another embodiment, the present invention discloses a passive radiator with adjustable working frequency comprises a chassis; a first vibration plate is connected to the chassis by a first suspension edge; a first added weight device is arranged on the first vibration plate; a second vibration plate is connected to the chassis by a second suspension edge; a second added weight device is arranged on the second vibration plate; the first vibration plate and the second vibration plate are arranged at corresponding positions on the front side and the rear side of the chassis, and the first added weight device and the second added weight device have same weight for balancing the first vibration plate and the second vibration plate.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The sound propagation is achieved through the response of vibration. The lower the frequency is, the weaker the responses are; therefore, it is difficult for most audio device to reproduce the bass signal. The current bass speaker usually has the passive radiator to enhance the bass response.

Figure 1B:
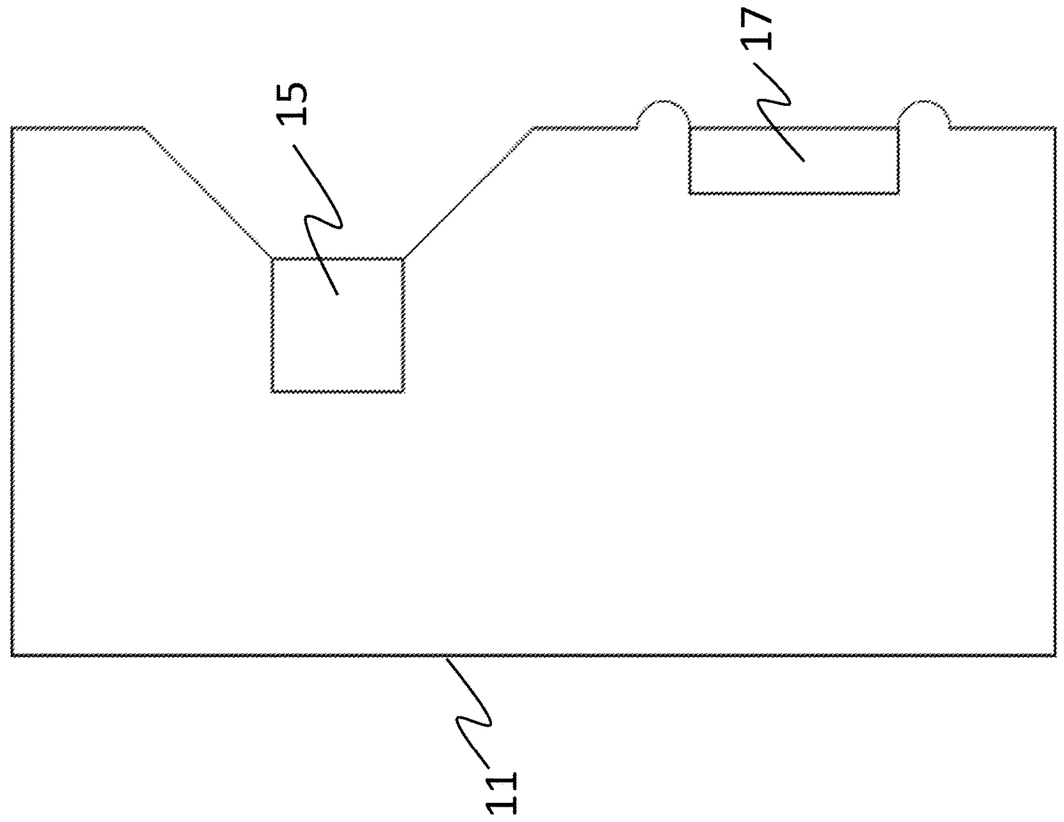
FIG. 1B (prior art)
FIG. 1B shows a cross-section view of a traditional passive radiator speaker according to the prior art.
Figure 1A:
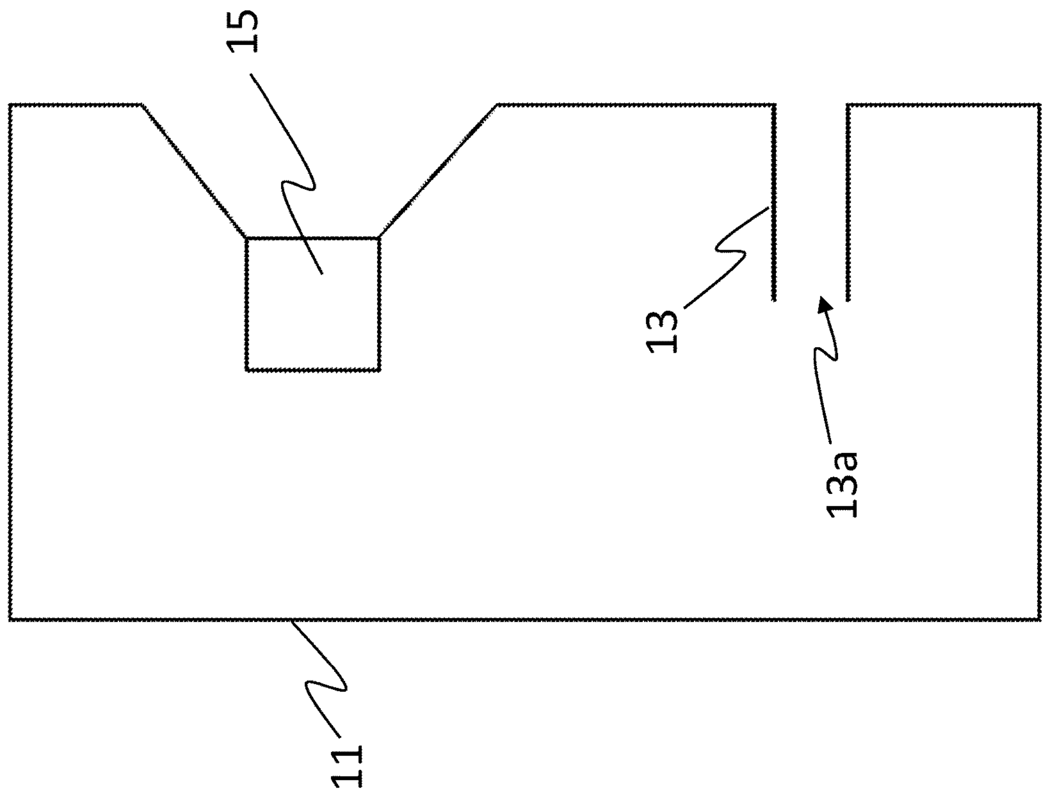
FIG. 1A (prior art)
FIG. 1A shows a cross-section view of a traditional bass reflex speaker according to the prior art.
Figure 2A:
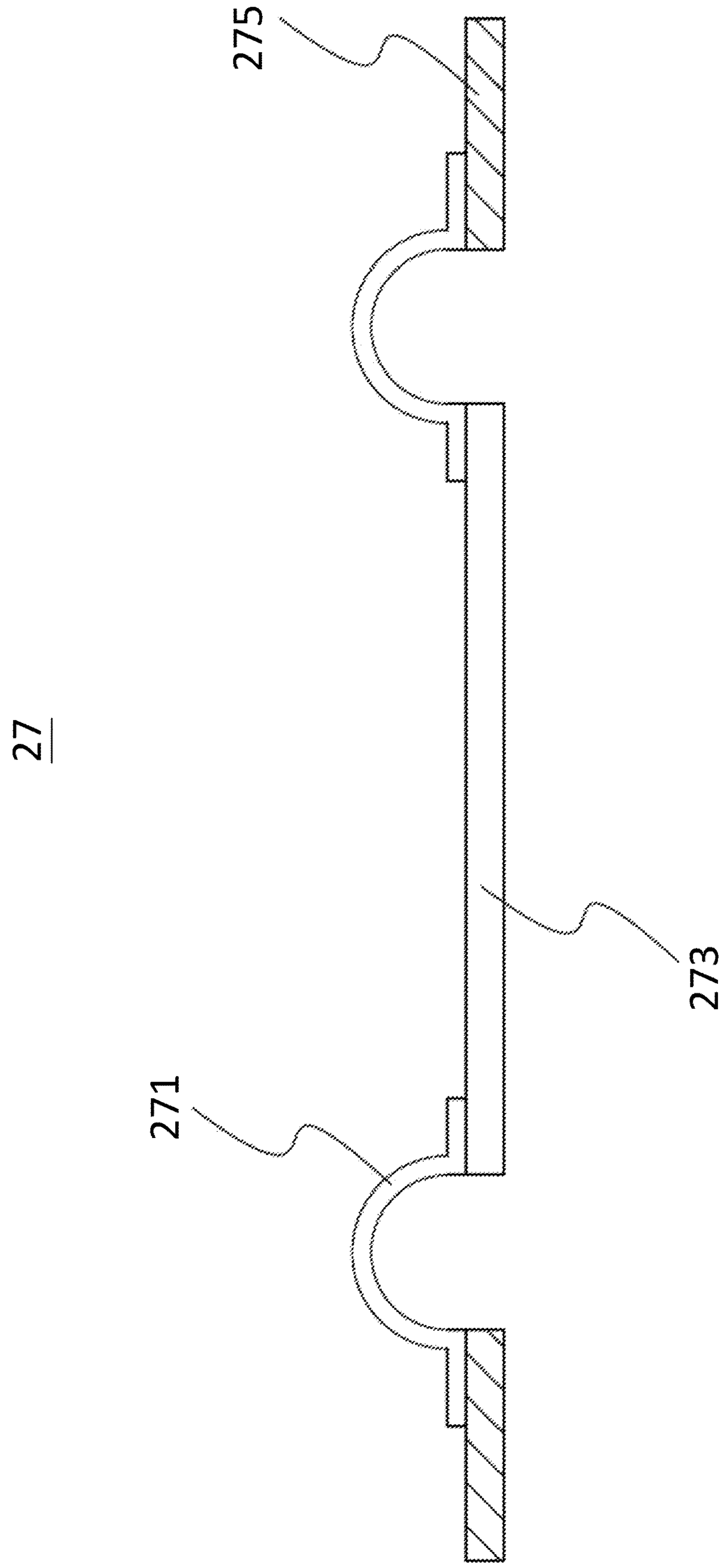
FIG. 2A (prior art)
FIG. 2A shows a cross-section view of the passive radiator according to the present invention.
Figure 2B:
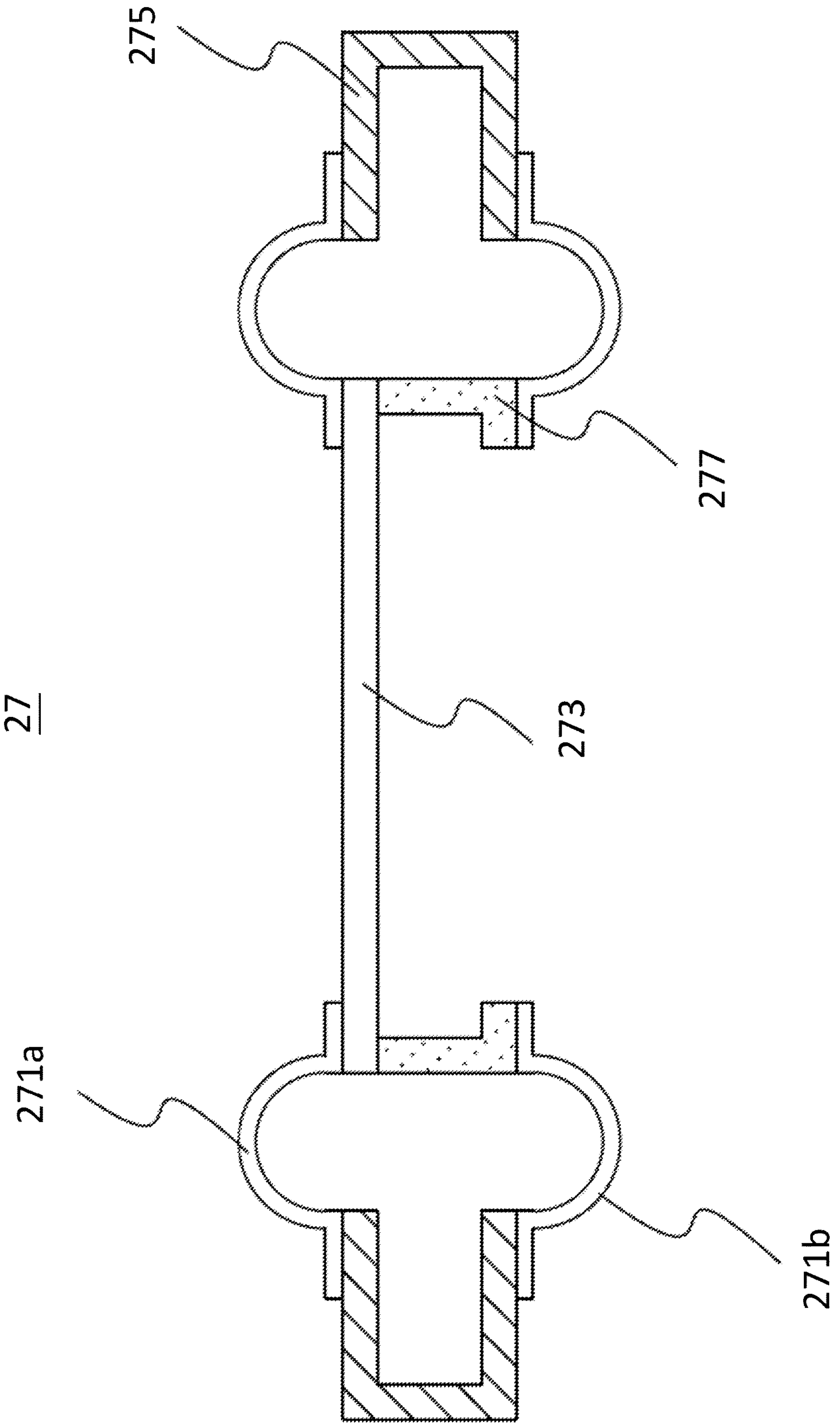
FIG. 2B (prior art)
FIG. 2B shows a cross-section view of anther passive radiator according to the present invention.

The traditional passive radiator 27 is shown in FIG. 2A, it is composed of a suspension component, that is, the suspension edge 271, the vibration plate 273, and the outer supporting frame 275, where the supporting frame 275 is part of a chassis (refer to FIG. 1B) or a fixed component which is combined with the chassis. The suspension edge 271 is made of elastic material (such as rubber) and is coupled between the vibration plate 273 and the outer supporting frame 275. The vibration plate 273 may vibrate through the suspension edge 271. In order to increase its vertical vibration stability, some passive radiators 27 are designed to have a first suspension component 271*a* and a second suspension component 271*b* respectively disposed on the upper and lower sides of the outer supporting frame 275 as shown in FIG. 2B. The vibration plate 273 is coupled to the inner supporting frame 277. Both the inner supporting frame 277 and the outer supporting frame 275 have extending structures that are perpendicular to the surface of the vibration plate 273 for increasing the vertical vibration stability of the vibration plate 273. The suspension component 271*a* is employed as suspension edge, and the second suspension component 271*b* acts as another suspension edge or spider/damper. The vibration plate 273 and the inner supporting frame 277 are connected with the outer supporting frame 275 by the first suspension component 271*a* and the second suspension component 271*b*.

The weight (m) of the vibration plate is inversely proportional to the resonant frequency (f), $f=(1/2\pi)\sqrt{(k/m)}$, as the weight increases, the resonant frequency decreases, the k is constant. The working frequency is fix in the prior art due to the weight is fix. In the present invention, different counterweights are used in the speakers to adjust the frequency response of the bass.

Figure 3:
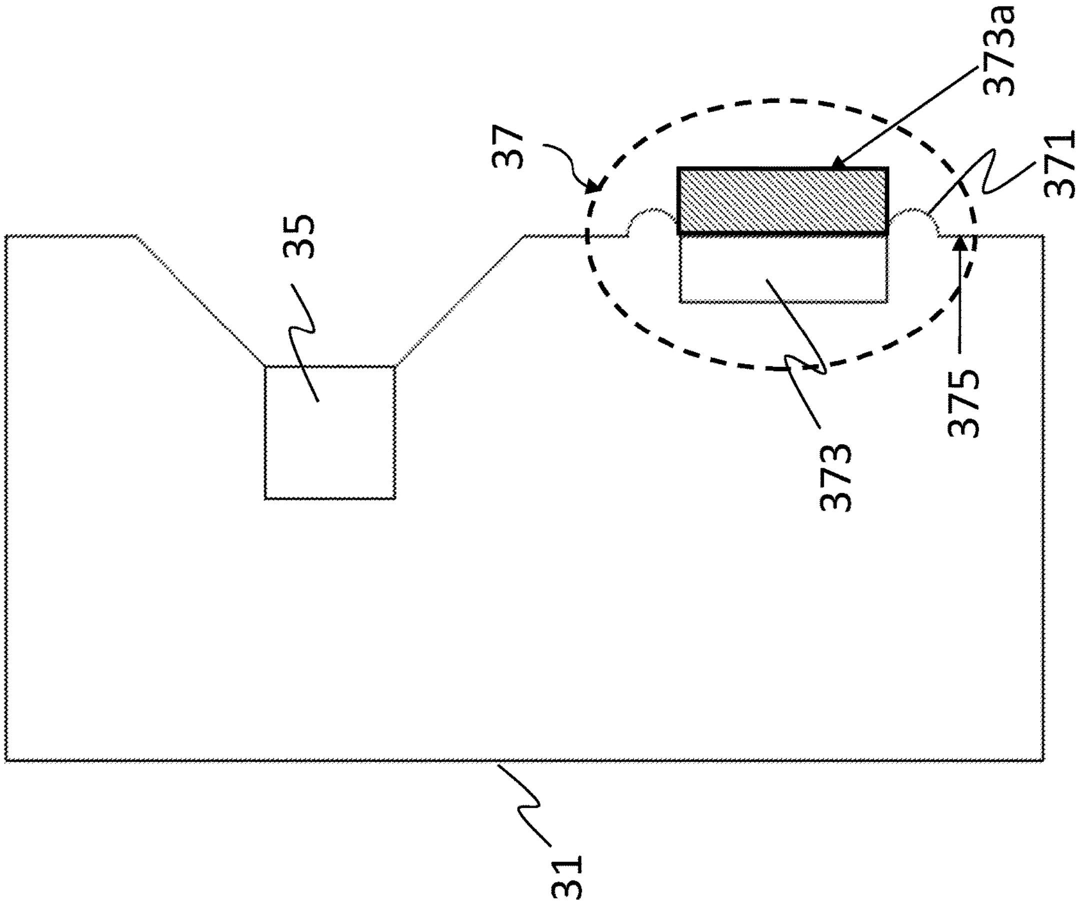
FIG. 3 shows a cross-section view of the passive radiator speaker according to the present invention.
Figure 4:
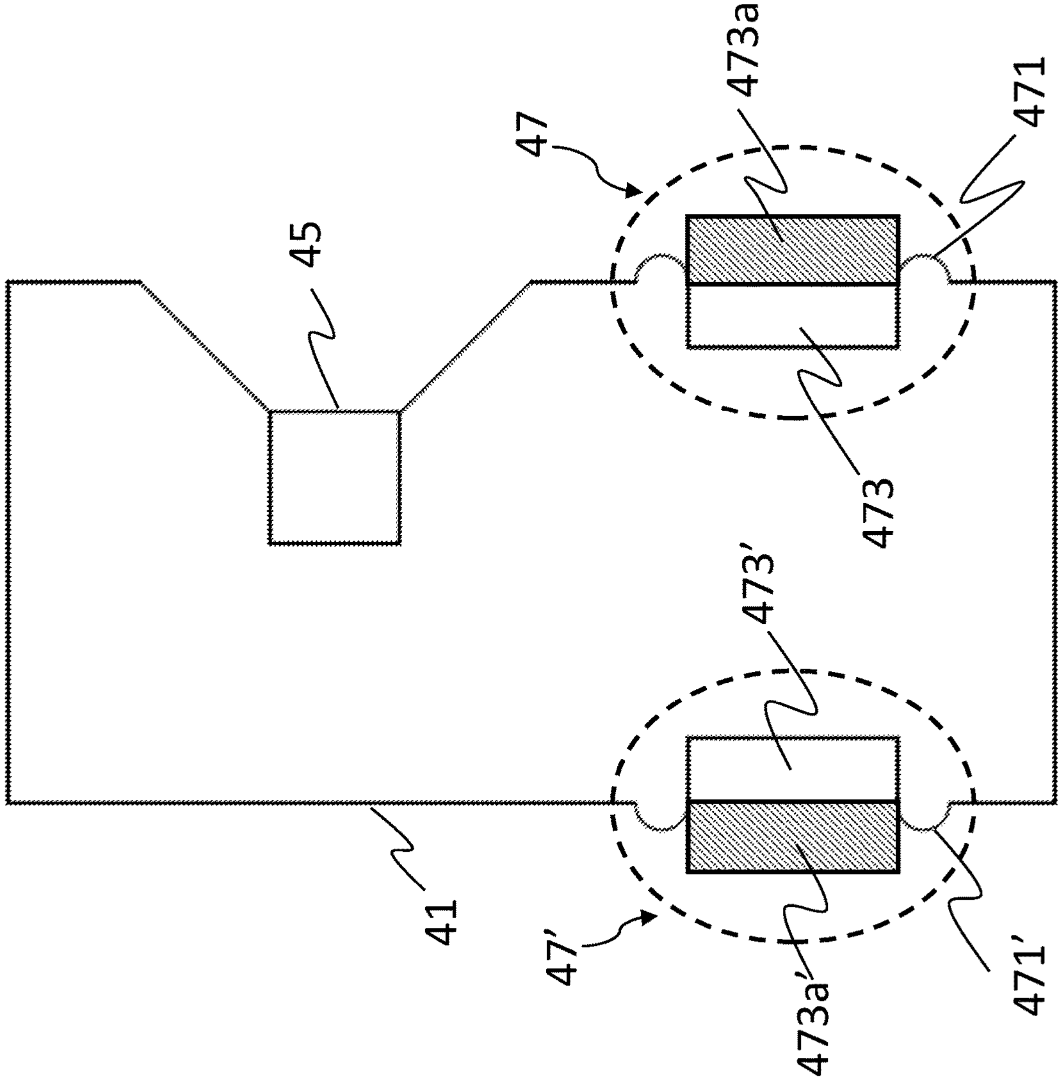
FIG. 4 shows a cross-section view of anther embodiment of the passive radiator speaker according to the present invention.

As shown in FIG. 3-4, the present invention discloses that the work frequency of the passive plate can be adjusted by changing the passive plate of different weight (added weight devices with different weights are configured on the passive plate).

FIG. 3 shows a speaker according to an embodiment of the present invention. The operating frequency of the passive plate is adjustable by arranging devices of different weights on the passive plate. As shown in FIG. 3, the structure of the passive plate 37 is composed of a suspension component, that is, a suspension edge 371, a vibration plate 373, an added weight device 373*a* arranged on the vibration plate 373, and an outer supporting frame 375. The supporting frame 375 is a part of the chassis or a fixed component that is combined with the chassis. The suspension edge 371 is made of elastic material (such as rubber) for coupling the vibration plate 373 and the supporting frame 375. The supporting frame 375 may be a part of the chassis 31. The vibration plate 373 is coupled to the outer supporting frame 375 by the suspension edge 371. The passive plate 37 responds to the low-frequency sound waves generated by the speaker 35. The added weight device 373*a* arranged outside the vibration plate 373 can adjust the working frequency of the passive plate 37. The added weight device 373*a* is replaceable (replace by different weight).

FIG. 4 shows a speaker according to another embodiment of the present invention. The working frequency of the passive plate is adjustable by arranging dual passive plates at the front and the rear sides of the speaker 41. Similar to the configuration of FIG. 3, FIG. 4 shows the speaker with dual passive plates, namely, a first passive plate 47 and a second passive plate 47 are provided on the front and the rear sides of the chassis 41. The structure of the first passive plate 47 includes a first vibration plate 473 movably coupled to the chassis 41 through a first suspension 471, and a first added weight device 473*a* is disposed outside the first vibration plate 473. The second passive plate 47' includes a second vibration plate 473' movably coupled to the chassis 41 through a second suspension edge 471', and a second added weight device 473*a'* disposed on the second vibration plate 473'. The first vibration plate 473 and the second vibration plate 473' are respectively disposed at corresponding positions on the front and the rear sides of the chassis 41, and the first added weight 473*a* and the second added weight 473*a'* have the same weight. The vibrations between the first vibration plate 473 and the second vibration plate 473' are balanced. Similarly, the added weight devices mounted on the outside of each passive plates are also replaceable (replace by different weight).

[0034] In one embodiment, the added weight device is assembled on the passive plate by magnetic attraction, screw fixation, buckle fixation, or Hook and loop fastener.

Figure 5A:
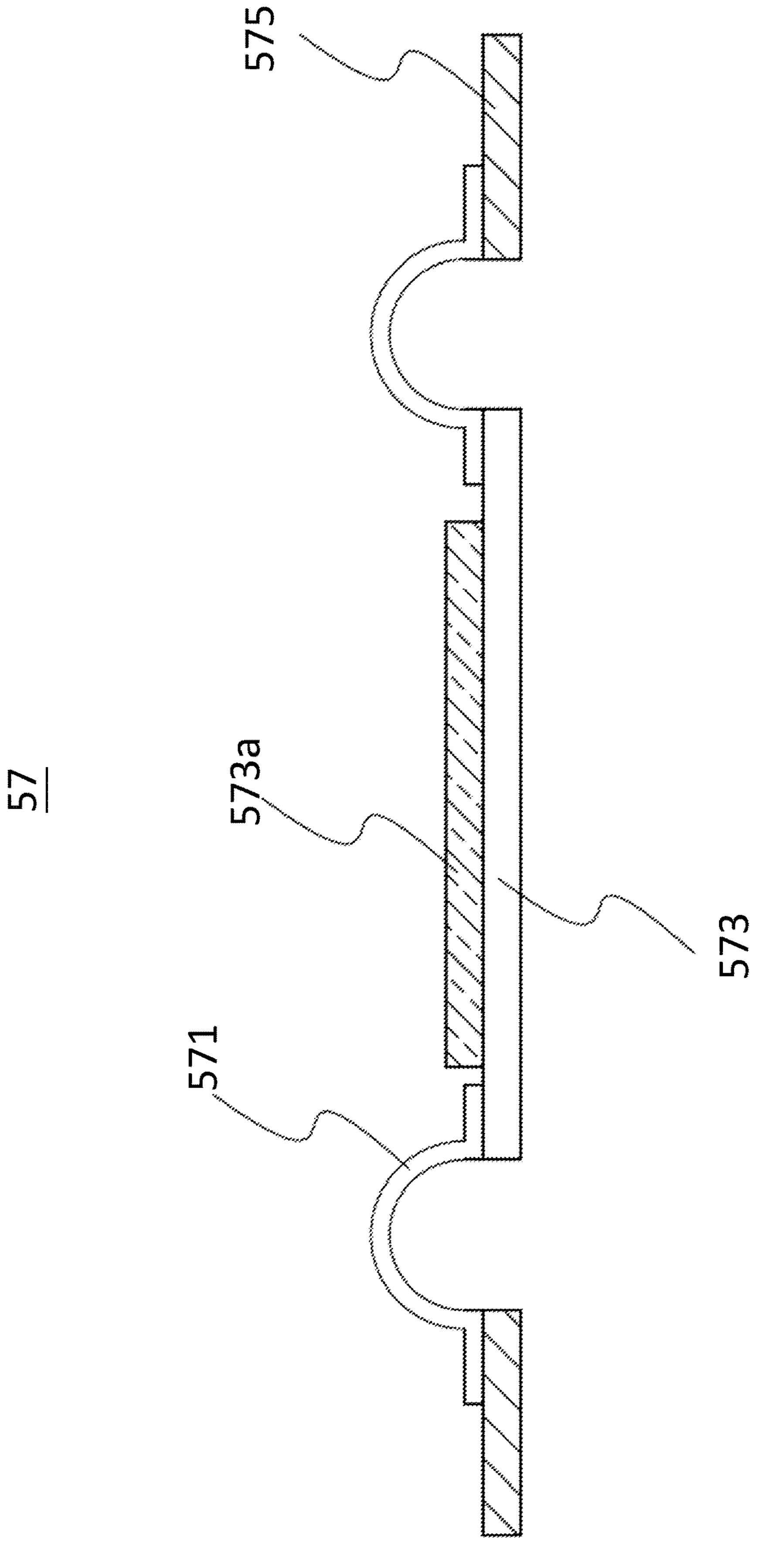
FIG. 5A shows a cross-section view of the passive radiator with adjustable weight according to the present invention.
Figure 5B:
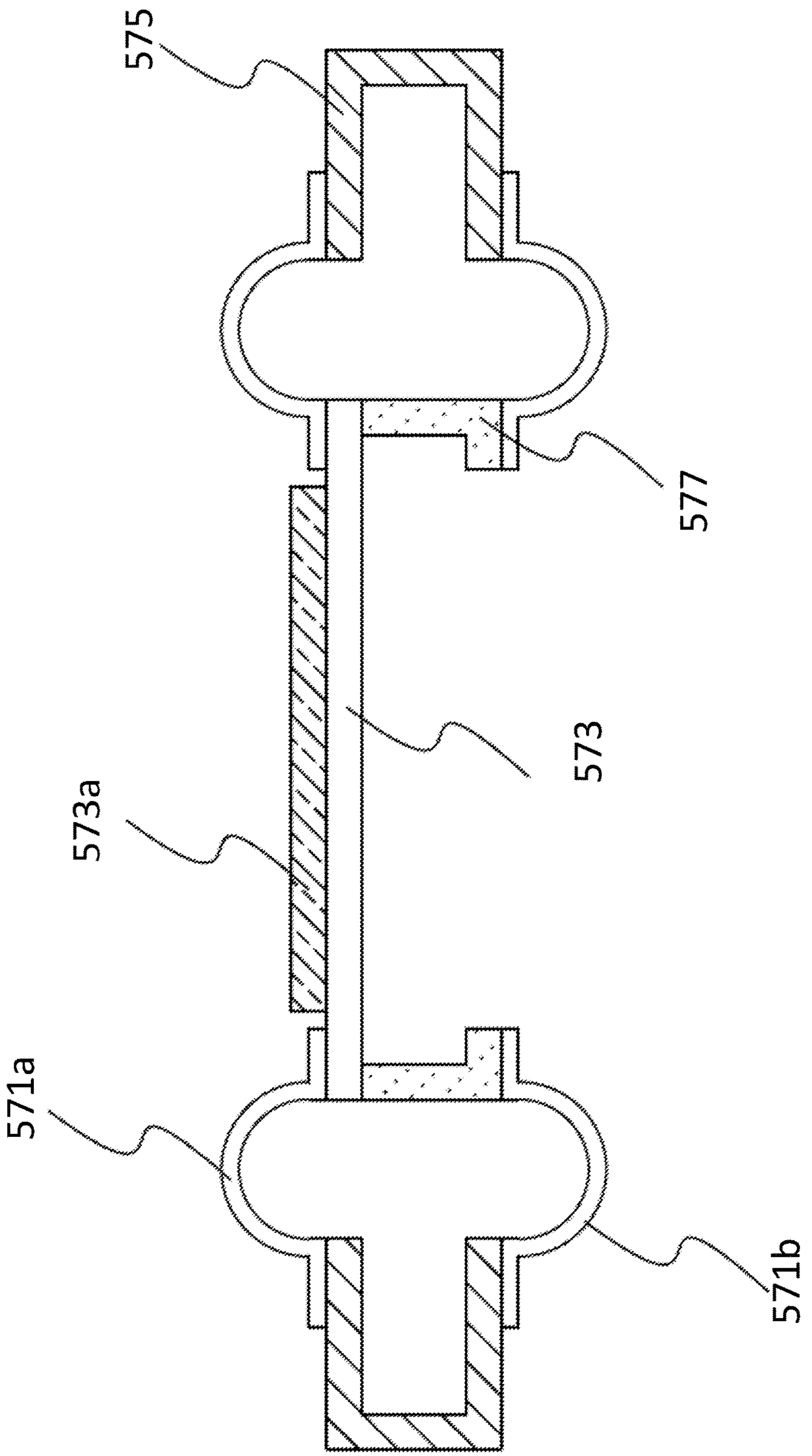
FIG. 5B shows a cross-section view of the passive radiator with adjustable weight according to the present invention.

FIG. 5A-FIG. 5B show a schematic cross-sectional view of a replaceable weight added weight device 573*a* mounted on the outside of the passive plate 57.

As shown in FIG. 5A, the structure of the passive plate 57 is composed of a suspension component, that is, a suspension edge 571, a vibration plate 573, an added weight device 573*a* arranged on the vibration plate 573, and an outer supporting frame 575. The supporting frame 575 is a part of the chassis (refer to FIG. 3) or a fixed component that is combined with the chassis. The suspension edge 571 is made of elastic material (such as rubber) and is used to couple the vibration plate 573 and the outer supporting frame 575. The passive plate 57 responds to the low-frequency sound generated by the speaker. The working frequency of the passive plate 57 can be adjustable by changing the added weight device 573*a* disposed outside the vibration plate 573. The weight of the added weight device 573*a* is replaceable, namely, the entire passive plate is weight-replaceable.

As shown in FIG. 5B, the structure of the passive plate 57 includes the first suspension component 571*a* and a second suspension component 571*b* respectively formed on the upper and lower sides of the outer supporting frame 575 for coupling with the inner supporting frame 577. The inner supporting frame 577 and the outer supporting frame 575 both have vertically extended frame structures to increase the vertical vibration stability of the vibration plate 573. The first suspension component 571*a* functions as a suspension edge, and the second suspension component 571*b* acts as the suspension edge or spider/damper. The vibration plate 573 and the inner supporting frame 577 are movably coupled to the outer supporting frame 575 through the first suspension component 571*a* and the second suspension component 571*b*. The outer supporting frame 575 is a part of the chassis (see FIG. 3) or a fixed component combined with the chassis. The suspension edge is made of elastic material (such as rubber) for coupling the vibration plate 573 and the outer supporting frame 575, the passive plate 57 responds to the low-frequency sound waves generated by the speaker (see FIG. 3). The working frequency of the passive plate 57 can be adjusted through the added weight device 573*a* disposed outside the vibration plate 573. The weight of the added weight device 573*a* is replaceable, the entire passive plate is weight-replaceable.

In one embodiment, the added weight device 573*a* may be replaced by another added weight device with different weight.

The added weight devices 573*a* may be plates with different materials or thicknesses.

Figure 6:
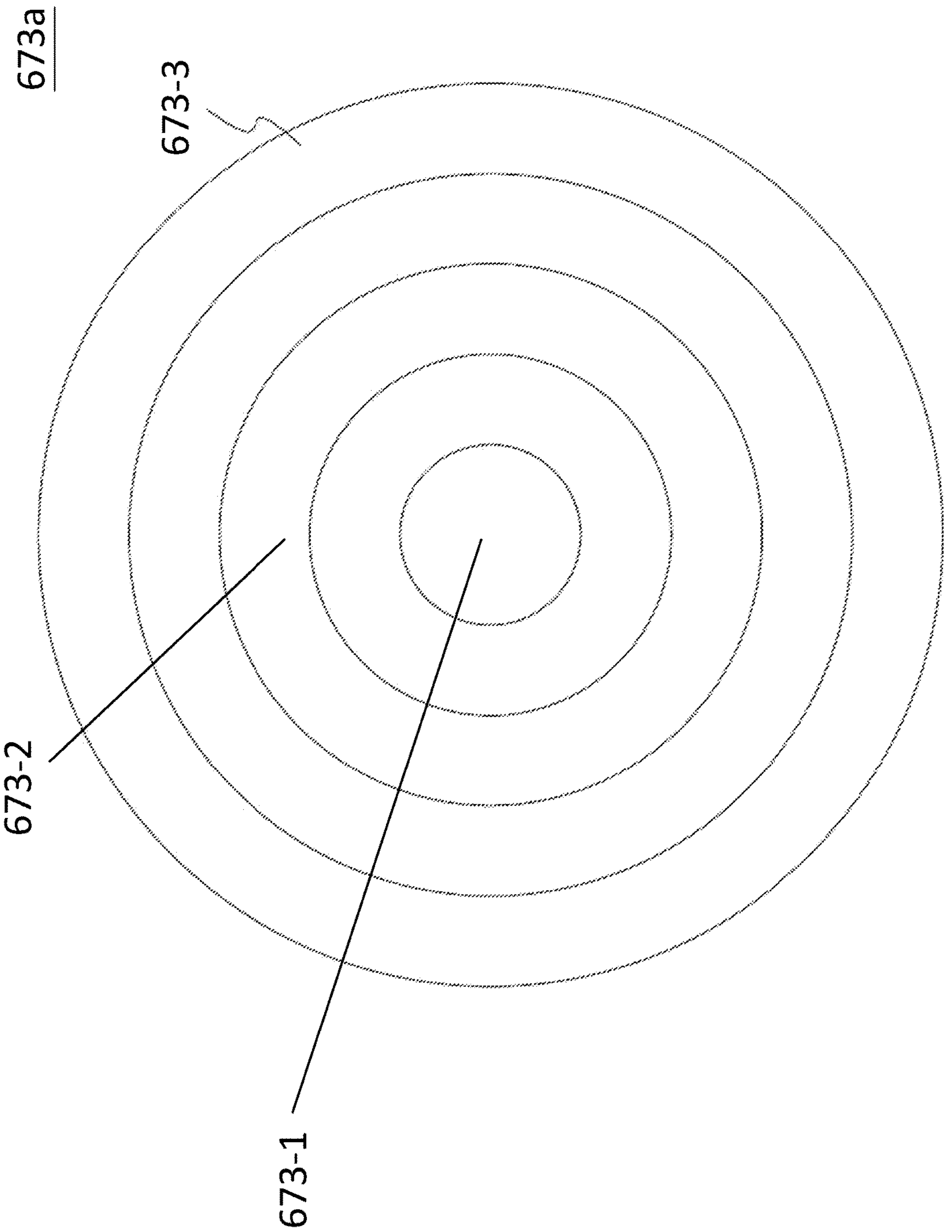
FIG. 6 shows an embodiment of the adjustable weight according to the present invention.

Several different-weight added weight devices 573*a* maybe employed to integrate themselves together, thereby forming a more weight devices 673*a*. Referring to FIG. 6, the integrated added weight devices 573*a* includes a central weight 673-1 and several annular weights (673-2, 673-3) with different sizes.

In one embodiment, the shape of the annular weight may be circular, square, or any symmetrical shape.

In one embodiment, the added weight devices may be electronic products such as mobile phones, tablet computers, and e-books.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A passive radiator with adjustable working frequency, comprising:

a chassis;

a first vibration plate connected to said chassis by a first suspension edge;

a first added weight device arranged on said first vibration plate;

a second vibration plate connected to said chassis by a second suspension edge;

a second added weight device arranged on said second vibration plate;

wherein said first vibration plate and said second vibration plate are arranged at corresponding positions on a front side and a rear side of said chassis, said first added weight device and said second added weight device having same weight for balancing said first vibration plate and said second vibration plate, wherein said first or said second added weight device comprises a plurality of different weight added weight devices, wherein the plurality of different weight added weight devices are integrated together to form an integrated added weight device which includes a central weight and at least one annular weight.

2. The passive radiator of claim 1, wherein said first or said second added weight device is formed on said vibrating plate by magnetic attraction, screw fixation, buckle fixation, or hook and loop fastener.

3. The passive radiator of claim 1, wherein plurality of different weight added weight devices of said first or said second added weight device are provided with different materials.

4. The passive radiator of claim 1, wherein the plurality of different weight added weight devices of said first or said second added weight device are provided with different thicknesses.

5. The passive radiator of claim 1, wherein said first or said second added weight device includes a mobile phone, a tablet computer or an e-book.

* * * * *